Figure 1:
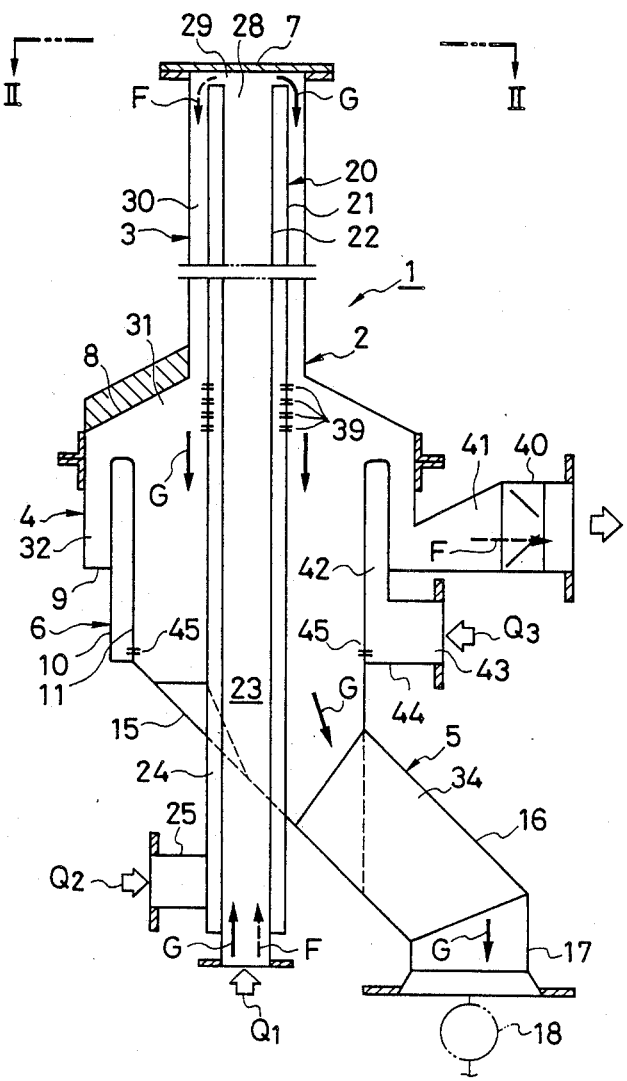

United States Patent [19]

Manable et al.

[11] Patent Number: 4,882,042
[45] Date of Patent: Nov. 21, 1989

[54] FLOSS SEPARATING APPARATUS AND METHOD

[75] Inventors: Koichi Manable, Chiba; Mitsumura Naka; Mitsushi Futamura, both of Osaka, all of Japan

[73] Assignees: Sumitomo Chemical Company, Ltd.; The Nippon Aluminum Manufacturing Company, Ltd., both of Osaka, Japan

[21] Appl. No.: 275,829

[22] Filed: Nov. 25, 1988

Related U.S. Application Data

[63] Continuation of Ser. No. 3,007, Jan. 13, 1987, abandoned.

[30] Foreign Application Priority Data

Jan. 13, 1986 [JP] Japan .................................. 61-6018

[51] Int. Cl.$^4$ .............................................. B07B 3/00
[52] U.S. Cl. ..................................... 209/138; 209/145; 209/152
[58] Field of Search ............... 209/133, 134, 138, 143, 209/145, 152

[56] References Cited

U.S. PATENT DOCUMENTS

| | | | |
|---|---|---|---|
| 1,333,127 | 3/1920 | Nall | 209/145 |
| 1,624,519 | 4/1927 | Stebbins | 209/145 |
| 3,550,599 | 12/1970 | Johansson | 209/138 |
| 3,618,761 | 11/1971 | Francis et al. | 209/152 |
| 4,242,197 | 12/1980 | Voelskow et al. | 209/145 |
| 4,526,678 | 7/1985 | Myren et al. | 209/145 |
| 4,528,092 | 7/1985 | Krambrock et al. | 209/138 |

*Primary Examiner*—Sherman D. Basinger
*Assistant Examiner*—Stephen P. Avila
*Attorney, Agent, or Firm*—Sughrue, Mion, Zinn, Macpeak & Seas

[57] ABSTRACT

An apparatus and method for separating floss from particles conveyed in a primary gas. The primary gas strikes a plate in a closed hopper so that the primary gas, particles and floss are deflected downwardly through an annular passageway to an annular separation section. A secondary gas is jetted radially outwardly in the separation section to deflect the floss to a floss discharge tube. The heavier particles continue falling into a closed particle discharge passageway into which a tertiary gas is jetted so that it flows upwardly to the separation section. The particles but no gas are discharged from the lower end of the particle discharge passageway.

6 Claims, 2 Drawing Sheets

FLOSS SEPARATING APPARATUS AND METHOD

This is a continuation of application Ser. No. 7,003,007 filed Jan. 13, 1987, now abandoned.

BACKGROUND OF THE INVENTION

1. Field of the Invention

This invention relates to a floss separating apparatus which is used in pipelines conveying particles such as chemical raw materials with the aid of gas. The apparatus separates floss materials (such as tape-shaped films or powder) from the particles.

2. Background of the Invention

In general, in conveying particles of synthetic resin such as polyethylene with the aid of air, the particles may become molten and stuck to the inner wall of a conveying pipe by frictional heat. The particles thus stuck are peeled off from the pipe wall, thus forming small pieces of film. If the pipe wall is uneven, the particles are worn into powder during the transport of particles. The pieces of film peeled off from the pipe wall or the powder thus formed lower the quality of the resultant product. In addition, sometimes the pieces of film and the powder are mixed together, thus forming pill-shaped balls which make it difficult to discharge the particles through the hopper. Depending on the method of use, the powder may cause public hazards. Therefore, it is necessary to separate the pieces of film and the powder (hereinafter referred to as "floss materials" or merely as "floss,") from the particles during the conveyance. An apparatus for satisfying this requirement has been proposed by Japanese Utility Model Application Publication No. 6432/1980.

In the conventional apparatus, the stream of particles are conveyed downwardly with the aid of air. A floss separating air stream is jetted horizontally to the stream of air-carried particles to thereby move the floss materials sidewards to remove them from the stream of particles. In the conventional apparatus, the floss materials are separated from the particles by utilization of the difference between the floating velocity of particles falling freely and the floating velocity of the floss materials. That is, the velocity of the air curtain is set to a value higher than the floating velocity of floss and much lower than the floating velocity of particles. Therefore, in separating a substance that has a small difference in the floating velocity from the particles, the separation efficiency is low. The pieces of tape-shaped film, being floated in the floss separating section, are liable to form pill-shaped balls. The balls thus formed increase in weight and may clog the fluid discharging outlet, which lowers the separation efficiency.

Another example of the floss separating apparatus has been disclosed by Japanese Patent Application (OPI) No. 133878/1983 (the term "OPI" is used herein meaning "an unexamined published application"). In the apparatus, particles are conveyed downwardly with the aid of air, while a floss separating air stream is jetted into the stream of particles upwards, thereby to remove floss from the stream of particles. In the apparatus, in order to improve the efficiency of a floss separating in which particles are allowed to freely fall down, the particles are conveyed by a stream of gas, and the difference between the velocity of the particles and the velocity of the secondary gas is utilized. However, in the apparatus, the classification and the separation are carried out at the same place, and therefore the floss materials separated may be mixed into the particles which fall continuously. That is, the apparatus is also disadvantageous in that the separation efficiency is low.

Thus, it is difficult for these conventional apparatuses to sufficiently separate the floss from the particles.

In addition, floss separating apparatuses have been disclosed by Japanese patent application Publication No. 16626/1979, Japanese patent application (OPI) No. 80063/1976, Japanese patent application Publication No. 11264/1983 and Japanese Utility Model Application Publication No. 25096/1979. However, similarly as in the above-described conventional apparatus, these floss separating apparatuses are also disadvantageous in that the floss cannot be sufficiently removed from the particles.

This invention is intended to increase the floss separation efficiency in a floss separating system or apparatus utilized for a system of conveying particles with the aid of gas stream.

In the invention, secondary and tertiary gas streams are utilized for separation of floss. That is, in a floss separating apparatus of the invention, a hopper with a closed structure having a cylindrical wall is arranged in such a manner that the hopper extends vertically. A pipe-shaped structure is arranged inside the hopper in such a manner that the pipe-shaped structure extends vertically and is coaxial with the hopper so that an annular passageway space is formed between the hopper wall and the pipe-shaped structure. The passageway space provides a particle flow down section. A floss separating section and a particle discharging passageway are arranged in the stated order from above. A space above the upper end of the hopper is utilized to form a particle scattering section. The outlet of a particle conveying passageway for conveying particles with primary gas opens into the central portion of the particle scattering section. A striking plate is provided at a position where the striking plate confronts the outlet of the particle conveying passageway. The upper end of the particle flow down section opens into the periphery of the particle scattering section. A partition wall structure is provided in such a manner that the partition wall structure surrounds the particle discharging passageway. A floss discharging annular floss passageway is provided around the partition wall structure. The upper end of the floss passageway opens into the periphery of the floss separating section. A secondary gas passageway is formed inside the pipe-shaped structure. A plurality of secondary gas jetting outlets are formed in the part of the pipe-shaped structure which is surrounded by the floss separating section in such a manner that the secondary gas jetting outlets are distributed all around the pipe-shaped structure. The partition wall structure is hollow, thus providing a tertiary gas chamber. A plurality of tertiary gas jetting outlets are formed in the partition wall of the partition wall structure which is located between the tertiary gas chamber and the particle discharging passageway in such a manner that the tertiary gas jetting outlets are distributed all around the partition wall and the lower outlet of the particle discharging passageway is connected to a particle discharging mechanism which can discharge particles while substantially interrupting the flow of gas.

In one embodiment of the invention, the above-described pipe-shaped structure is a dual-pipe structure having an outer wall and an inner wall, the particle conveying passageway is formed inside the inner pipe.

The upper end opening of the inner pipe forms the outlet of the particle conveying passageway. The second gas passageway is provided by the annular space between the outer pipe and the inner pipe of the pipe-shaped structure.

Particles with floss materials are conveyed in the particle conveying passageway with the aid of the primary gas stream into the particle scattering section.

The particles, striking against the striking plate, are uniformly scattered towards the periphery of the particle scattering section and are delivered to the upper end of the particle flow down section.

The particles flow down the particle flow down section while being uniformly scattered therein. While flowing down the particle flow down section in this manner, the particle flow is rectified and forms, cylindrical film stream (the velocity being about 10 to 30 m/s), and the cylindrical stream of particles runs into the floss separating section.

In the floss separating section, as shown in FIG. 4, the secondary gas streams are jetted at high velocity (80 to 250 m/s) from the number of secondary gas jetting outlets formed in the outer pipe of the pipe-shaped structure in the region immediately below the particle flow down section in such a manner that the secondary gas streams go across the cylindrical stream of particles, while the tertiary gas streams are blown up the pipe-shaped structure from the particle discharging passageway at a velocity (3 to 7 m/s) lower than the floating speed of the particles.

The heavy particles introduced into the floss separating section have been accelerated and have an inertia imparted thereto. Therefore, the particles pass through the secondary gas streams running horizontally and the tertiary gas streams moving upwardly, and flow into the particle discharging passageway.

On the other hand, the floss materials have small inertia (being small in mass). Therefore, upon arrival at the floss separating section, the floss materials are blown outwards by the secondary gas streams jetted radially outwardly at high velocity. As a result, the floss materials are caused to flow on the outward composite stream of the primary, secondary and tertiary gas streams into the floss passageway.

The floss materials delivered into the floss passageway are discharged therefrom, while the particles delivered into the particle discharging passageway are discharged through the particle discharging mechanism.

The particle discharging mechanism can substantially interrupt the flow of gas. That is, the particle discharging mechanism can prevent the flow of secondary or tertiary gas through it. Accordingly, the secondary gas streams flowing radially outwardly and the tertiary gas streams upwardly can be positively formed as was described above.

BRIEF DESCRIPTION OF THE DRAWINGS

FIG. 1 is a vertical sectional view outlining one example of a floss separating apparatus according to this invention.

FIG. 2 is a view in the direction of the line II—II in FIG. 1.

FIG. 3 is a vertical sectional view outlining essential parts of another example of the floss separating apparatus according to the invention.

FIG. 4 is a vertical sectional diagram for a description of the flows of gases in a floss separating section in the apparatus.

DETAILED DESCRIPTION OF THE PREFERRED EMBODIMENTS

FIG. 1 is a vertical sectional view of one example of a floss separating apparatus according to this invention. As shown in FIG. 1, a hopper 1 has a substantially cylindrical wall 2 and extends vertically as a whole. The wall 2 is made up of the upper wall 3, the intermediate wall 4, the lower wall 5 and a partition wall structure 6.

The upper wall 3 is relatively small in diameter, and has its upper end closed with a striking plate 7. The lower end portion 8 of the upper wall 3 is expanded in tapered form and coupled to the upper end of the intermediate wall 4. The intermediate wall 4 is relatively large in diameter and has a lower end portion 9 which is in the form of a circular flange 9. The flange-shaped lower end portion 9 is connected to the middle portion of the outer wall of the partition wall structure 6. The partition wall structure 6 is a hollow structure made up of a cylindrical outer wall 10 and a cylindrical inner wall 11. The lower end of the inner wall 11 is continued (or connected) to the upper end of the lower wall 5. The lower wall 5 is made up of an upper part 15 which is extended obliquely downwardly with the diameter maintained unchanged, and a lower part 17 which is extended straight downwardly. The lower end of the lower part 17 is connected to a rotary valve 18 (or a particle discharging mechanism). The rotary valve 18 is so designed as to substantially interrupt the flow of gas thereby to discharge only particles.

A pipe-shaped structure 20 is arranged verticaly in the hopper 1 in such a manner that it covers almost the entire length of the hopper 1. The pipe-shaped structure 20 is disposed coaxially with the upper wall 3 and the intermediate wall 4 and its upper end is located near and below the striking plate 7. The lower end portion of the pipe-shaped structure 20 downwardly penetrates the lower wall's upper part 15. The pipe-shaped structure 20 is a dual pipe structure having an outer pipe 21 and an inner pipe 22. A particle conveying passageway 23 is formed within the inner pipe 22 and a secondary gas passageway 24 is formed between the outer pipe 21 and the inner pipe 22. The particle conveying passageway 23 has an inlet at the lower end. The inlet is connected to an external particle supply passageway (not shown). The secondary gas passageway 24 is coupled to an external secondary gas supply passageway (not shown) through a coupling pipe 25 at the lower end of the outer pipe 21.

The particle conveying passageway 23 has an outlet 28 at its upper end. The outlet is communicated with a scattering section 29. The scattering section 29 is the space between the upper end of the pipe-shaped structure 20 and the striking plate 7 and its circumferential portion is communicated with the upper end of a particle flow down section 30. The particle flow down section 30 is the space annular in section which is defined by the upper wall 3 and the upper portion of the outer pipe 21. That is, the particle flow down section 30 is in the form of a cylinder, the wall thickness and the sectional area of which is maintained unchanged over its entire length. The particle flow down section has its lower end communicated with a floss separating section 31.

The floss separating section 31 is the space between the tapered lower end portion 8 of the upper wall 3 and the upper end of the partition wall structure 6. The floss separating section 31 spreads radially outwardly more than the particle flow down section 30. An annular floss passageway 32 is formed between the intermediate wall 4 and the outer wall 10 of the partition wall structure 6. The outer circumferential portion of the floss separating section 31 opens into the upper end of the floss passageway 32.

The lower end of the floss separating section 31 opens into the particle discharging passageway 34 which is formed between the inner wall 11 of the partition wall structure 6 and the outer pipe 21 and inside the lower wall 5. The diameter of the inner wall 11 is slightly larger than that of the upper wall 3.

A number of secondary gas jetting outlets 39 which are slits or small holes laid in four lines are formed in the floss separating section 31 and close to the lower end of the particle flow down section 30.

The intermediate wall 4 has a floss discharging pipe 40 at its lower half which extends radially outwardly, thus providing a floss discharging passageway 41. The floss discharging passageway 41 has one end connected to the floss passageway 32 and the other end connected to an external floss discharging passageway (not shown).

The space annular in section between the outer wall 10 and the inner wall 11 of the structure 6 is employed as a tertiary gas chamber 42. The tertiary gas chamber 42 has its lower half connected through a passageway 43 to an external tertiary gas supplying passageway (not shown). The passageway 43 is formed by a coupling pipe 44 which is extended radially outwardly from the lower half of the outer wall 10. A number of tertiary gas jetting outlets 45, which are slits or small holes, are formed in the entire lower end portion of the inner wall 11.

Figure 2:
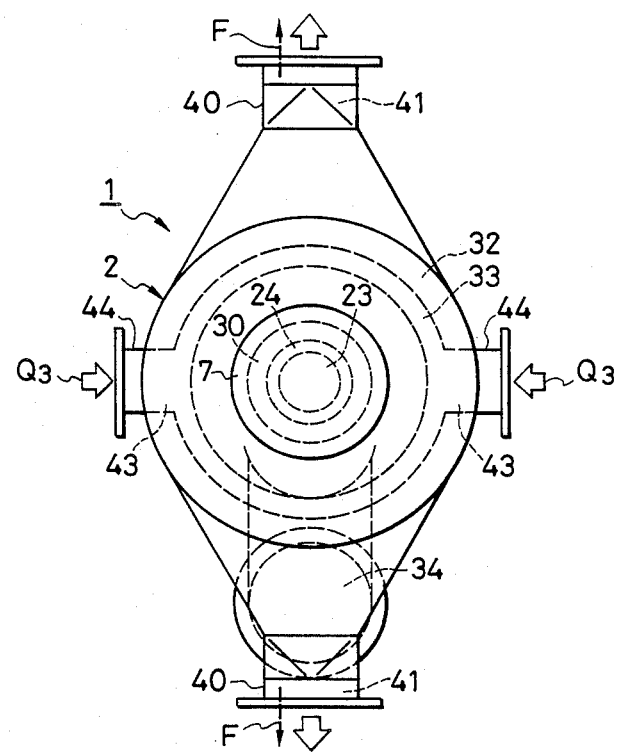

FIG. 2 is a view taken along the line II—II in FIG. 1. As shown in FIG. 2, the hopper 1 has two floss discharging pipes 40 which are disposed diametrically opposite to each other, and has two coupling pipes 44 for the tertiary gas chamber 42 which are also disposed diametrically opposite to each other and are perpendicular to the floss discharging pipes 40.

The operation of the floss separating apparatus thus constructed will be described.

Particles G mixed with floss materials F are supplied into the particle conveying passageway 23 from below by a primary gas $Q_1$ (such as air). The particle G thus supplied go up the particle conveying passageway 23 and flow through the outlet 28 into the scattering section 29. In the scattering section 29, the particles G, striking against the plate 7, are scattered towards the periphery of the scattering section 29. The particles G with the floss materials F thus scattered flow into the particle flow down section 30 and reach the floss separating section 31.

Figure 4:
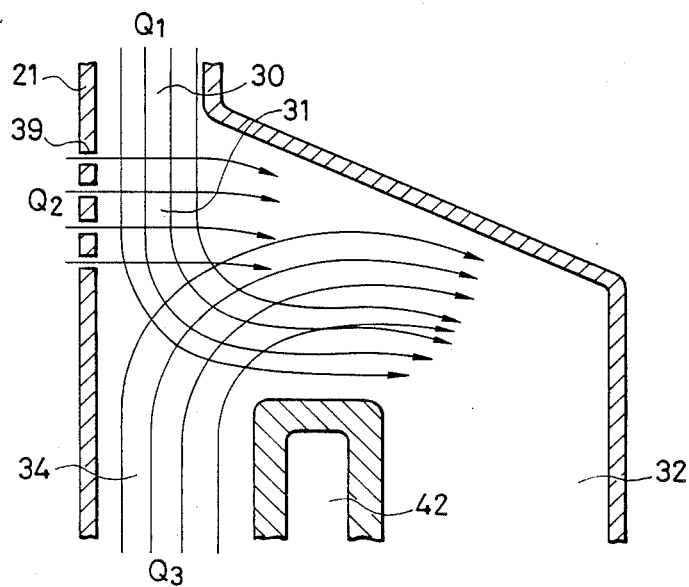

On the other hand, a secondary gas $Q_2$ (air) is supplied into the secondary gas passageway. In the floss separating section 31, the secondary gas thus supplied is jetted at high speed radially from the number of secondary gas jetting outlets 39 which are provided near the particle flow down section 30. A tertiary gas $Q_3$ (air) is supplied is jetted radially inwardly from the tertiary gas jetting outlets 45 into particle discharging passageway 34, and is then blown up the upper part of the passageway 34 at a velocity lower than the floating speed of the particles G. The flow of the gases $Q_1$, $Q_2$ and $Q_3$ is shown in FIG. 4.

Accordingly, the floss materials F which have flowed into the floss separating section 31 as was described above are blown towards the periphery of the floss separating section 31 by the secondary at high speed. As a result, the light floss materials F flow on the outward stream of primary, secondary and tertiary gases into the floss passageway 32.

On the other hand, the heavy particles G which have flowed down into the floss separating section 31 are maintained at a relatively high velocity by their inertia. Therefore, the particles G pass through the sideward stream of secondary gas and the upward stream of tertiary gas into the particle discharging passageway 34 below, and are then delivered through the rotary valve 18 into the external passageway or external container.

The floss materials F which have flowed into the floss passageway 32 as was described above are delivered out through the floss discharging passageways 41 and recovered for instance by a dust collector (not shown). The rotary valve 18 is so designed as to prevent the gas in the hopper 1 from flowing outside through the rotary valve 18. Therefore, the radially outward stream of secondary gas $Q_2$ and the upward stream of tertiary gas $Q_3$ can be positively formed.

In the above-described apparatus, the particle conveying passageway 23 extends straight with the sectional area maintained unchanged. Therefore, even if, in the above-described operation, the particles G and the floss materials F are supplied in a non-uniform distribution into the inlet of the particle conveying passageway 23, the distribution is made uniform while the particles and the floss flow up the particle conveying passageway 23. Accordingly, the particles G and the floss materials F, striking against the striking plate, are scattered uniformly to flow into the particle flow down section 30. The particle flow down section 30 also extend straight with the sectional area maintained unchanged. Therefore, the particles G and the floss materials F stream together while flowing down the particle flow down section 30. As a result, the particles G and the floss materials F flow in the form of a cylindrical film stream into the floss separating section 31.

The secondary gas jetting outlets 39 are the large number of slits or small holes formed in the part of the outer pipe of the pipe-shaped structure 20 which is surrounded by the floss separating section 31. Therefore, the secondary gas supplying passageway 24 is a pressure equalizing chamber, so that the secondary gas $Q_2$ is jetted uniformly and radially therefrom.

As for the tertiary gas $Q_3$, the tertiary gas chamber 42 serves as a pressure equalizing chamber. Therefore, the tertiary gas $Q_3$ is jetted uniformly and radially inwardly from the large number of tertiary gas jetting outlets which are formed in the inner wall of the partition wall structure 6. The lower end of the particle discharging passageway 34 is air-locked by the rotary valve 18. Therefore, the tertiary gas $Q_3$ blows up the upper part of the particle discharging passageway 34 at a substantially uniform flow rate. Thus, the floss materials F are uniformly and efficiently separated form the particles G in the floss separating section 31.

As shown in FIG. 2, the apparatus has a plurality of passageways 43 (two passageways in the embodiment) which are connected to the tertiary gas chamber 42 in such a manner that they are extended radially and arranged at intervals around the tertiary gas chamber 42. In this case, the pressure in the tertiary gas chamber 42 is supplied into the tertiary gas chamber through only one passageway.

Furthermore in the embodiment shown in the accompanying drawings, two floss discharging passageways 41 are provided in such a manner that they are disposed at intervals and extended radially of the floss passageway 32. Therefore, the floss materials F can be efficiently discharged over the entire circumference of the floss passageway 32. That is, according to the invention the difficulty can be eliminated that floss materials F are caught in the floss passageway 32. Accordingly, the floss materials F in the floss passageway 32 will never flow back into the floss separating section 31.

As is apparent from the above description, according to the invention, the floss materials F can be efficiently separated by utilizing the secondary gas $Q_2$ and the tertiary gas $Q_3$. Especially according to the invention, particles can be uniformly scattered and rectified, and the streams of secondary gas and tertiary gas can be made uniform with high efficiency, as was described above. Thus, the apparatus of the invention is sufficiently high in floss separation effect.

In the apparatus of the invention, the hopper 1 is of a cylindrical structure, and the particle flow down section 30 and the floss separating section 31 are made cylindrical. Therefore, in the apparatus of the invention, when compared with the apparatus in which the particle flow down section 30 and the floss separating section 31 are relatively flat, the sectional area of the floss separating section 31 (the area of the surface which confronts with the secondary gas jetting outlet 39) can be increased. That is, the capacity of treatment can be increased assuming that the dimensions of the apparatus are maintained unchanged (the diameter of the cylindrical hopper 1 of the invention is the same as the width of the flat hopper of the apparatus for comparison). In other words, in order to have the same capacity of treatment, the apparatus of the invention can be smaller in size than the comparative apparatus.

Figure 3:
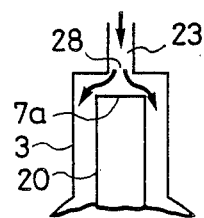

In another embodiment of the invention, as shown in FIG. 3, the upper end of the pipe-shaped structure 20 is closed with a striking plate 7a. The outlet 28 of the particle conveying passageway 23 (now running in the downward direction) is formed in the upper end of the hopper 1 in such a manner that the outlet 28 is confronted with the striking plate 7a.

What is claimed is:

1. A floss separating apparatus, comprising:
   a hopper with a closure structure having an outer cylindrical wall arranged such that said hopper extends vertically;
   a pipe-shaped structure arranged inside said hopper in such a manner that said pipe-shaped structure extends vertically and coaxially with said hopper so that a passageway space annular in section is formed between said hopper wall and said pipe-shaped structure, said passageway space providing a particle flow down section, a floss separating section and a particle discharging passageway which are arranged in the stated order from above;
   a particle scattering section formed in a space at an upper end of said hopper, wherein an outlet of a particle conveying passageway for conveying particles with a primary gas is communicated with a central portion of said particle scattering section, a striking plate is provided at a position where said striking plate confronts with said outlet of said particle conveying passageway, and an upper end of said particle flow down section is communicated with the periphery of said particle scattering section;
   a partition wall structure surrounding said particle discharge passageway;
   an annular floss discharging passageway disposed around said partition wall structure, an upper end of said floss passageway communicated with an outer periphery of said floss separating section;
   a secondary gas passageway formed inside said pipe-shaped structure;
   a plurality of secondary gas jetting outlets formed in a part of said pipe-shaped structure which is surrounded by said floss separating section in such a manner that said secondary gas jetting outlets are distributed around said pipe-shaped structure; and
   a particle discharging mechanism connected to a lower outlet of said particle discharging discharging passageway, said particle discharging mechanism discharging particles while substantially interrupting the flow of gas.

2. A floss discharging apparatus as recited in claim 1, wherein said partition wall structure is hollow, thus providing a tertiary gas chamber and a plurality of tertiary gas jetting outlets are formed in a partition located between said tertiary gas chamber and said particle discharging passageway, in such a manner that said tertiary gas jetting outlets are distributed around said partition wall.

3. A floss separating apparatus as recited in claim 2, wherein;
   said pipe-shaped structure is a dual-pipe structure having an outer pipe and an inner pipe;
   said particle conveying passageway is formed inside said inner pipe;
   an upper end opening of said inner pipe forms said outlet of said particle conveying passageway; and
   said second gas passageway is provided by the space annular in section between said outer pipe and said inner pipe of said pipe-shaped structure.

4. A floss discharging apparatus as recited in claim 2, wherein:
   said particle conveying passageway comprises a pipe at an upper end of said hopper; and
   said striking plate is disposed on an upper end surface of said pipe-shaped structure facing an opening of said pipe of said particle conveying passageway.

5. A method of separating floss, comprising the steps of:
   jetting a primary gas containing floss and particles against a striking plate in a closed hopper, whereby said floss and particles are conveyed in said primary gas downwardly through a particle flow down section to a floss separating section;
   jetting a secondary gas radially outwardly and horizontally across said floss separating section toward a floss discharging passageway, whereby said floss is deflected to said floss discharging passageway and said particles continue downward to a particle discharging passageway; and
   discharging said particles from a lower end of said particle discharging passageway substantially without removing said primary and secondary gas from said lower end of said particle discharging passageway.

6. A method of separating floss as recited in claim 5, further comprising jetting a tertiary gas into said particle discharging passageway below said floss separating section.

* * * * *